US000001235H

United States Statutory Invention Registration [19]

[11] Reg. Number: H1235

Canaday

[43] Published: Oct. 5, 1993

[54] ARMOR-PIERCING PROJECTILE

[75] Inventor: Michael C. Canaday, King George, Va.

[73] Assignee: The United States of America as represented by the Secretary of the Navy, Washington, D.C.

[21] Appl. No.: 887,411

[22] Filed: Jun. 18, 1986

[51] Int. Cl.[5] ..... F42B 12/44; F42B 12/04; F42B 12/24

[52] U.S. Cl. ..... 102/334; 102/473; 102/493; 102/517; 102/522

[56] References Cited

U.S. PATENT DOCUMENTS 2,922,366 1/1960 Lyon ..... 102/52
4,237,787 12/1980 Wacula et al. ..... 102/52
4,353,302 10/1982 Strandli et al. ..... 102/364

*Primary Examiner*—Harold J. Tudor
*Attorney, Agent, or Firm*—R. F. Beers; E. E. Goshorn; T. E. McDonnell

[57] ABSTRACT

Improved armor-piercing projectile of either caliber or saboted, subcaliber design for effectively penetrating and destroying a fast moving, armored target. The improved projectile is generally comprised of a dome-shaped nose, a fragmentable hollow body of thimble-like configuration, and an integrated base-plug and fuse device. The hollow body is advantageously made up of a heavy metal, preferably either a tungsten alloy or depleted uranium, having a predetermined density of at least eleven grams per cubic centimeter (11.0 gm/cc). The interior of the hollow body is filled with a suitable high energy explosive material. The improved projectile, by reason of its hollow body, not only exhibits an improved ballistic coefficient as compared to previous projectile designs, but also maintains a substantially more uniform velocity throughout its effective range so as to strike a target in shorter time and with greater momentum. As the result of this shorter time and greater momentum, the projectile has greater effectiveness in striking and penetrating a fast moving target as well as significantly increasing the probability that the penetrated target will be destroyed because of the exploded and formed body fragments having greater impact due to their increased density.

10 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

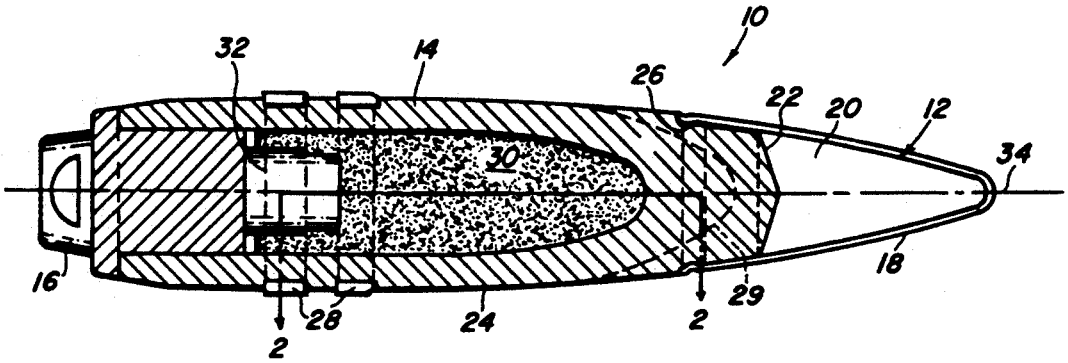
FIG. 1
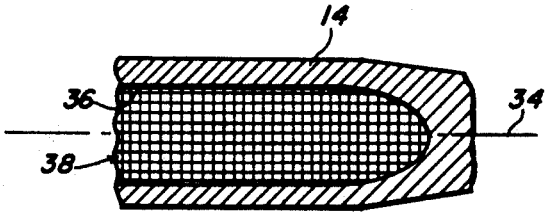
FIG. 2
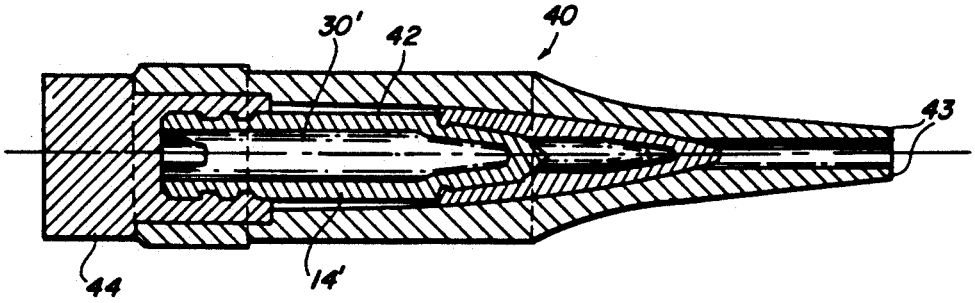
FIG. 3
FIG. 4
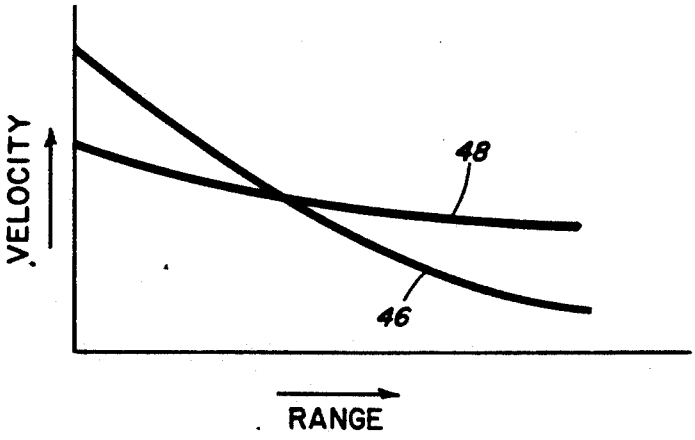

ARMOR-PIERCING PROJECTILE

This invention concerns an armor-piercing projectile; and, more particularly, it relates to an improved armor-piercing projectile not only having an enhanced ballistic coefficient but also having increased penetration characteristics.

BACKGROUND OF THE INVENTION

Various armor-piercing projectiles have been designed in the past. For example, U.S. Pat. No. 2,922,366 to G. A. Lyon discloses a projectile having a nose of concave or dish shape. Such a dishshaped nose facilitates penetration of an armored target when the projectile strikes the target at an oblique angle, U.S Pat. No. 4,237,787 to K. P. Wacula concerns an armor-piercing, incendiary projectile. The projectile is generally made up of a ballistic nose shield, an explosive, hollow-core body of a suitable metal material and a plug for closing the trailing open end of the body. An incendiary composition of a specified admixture is disposed between the nose and the body. A suitable pyrotechnic composition is disposed in the hollow core. By reason of the incendiary composition, the projectile is assisted in penetrating an armored target. U.S. Pat. No. 4,353,302 to K. R. Strandli et al. discloses an armor-piercing incendiary projectile for penetrating hard or soft targets. The projectile is generally made up of a nonferrous casing or mantle having a dome-shaped or ballistic end. A secondary penetration and fragmentable sleeve of ferrous or nonferrous material, e.g., a suitable grade of steel, titanium or zirconium, is provided in the casing at its trailing end. A primary penetration plug of a material heavier than the sleeve, such as tungsten carbide, is provided in the core of the sleeve at its trailing end. However, none of the aforediscussed references whether taken alone or in any combination recognized the increased threat of targets moving at higher speeds along with the targets having greater armor or penetration resistance. Thus the prior art projectiles failed to recognize the importance of having a projectile of simple construction that not only requires less time (improved ballistic coefficient) in striking a target but also has greater reliability in penetrating the target upon striking same so as to destroy it. To this end, the improved armor-piercing projectile of the invention is generally comprised of a dome-shaped nose, a hollow explosive fragmentable body of thimble-like shape and a base-plug fuse device. The hollow body is advantageously made up of a heavy material having a predetermined density of at least eleven grams per cubic centimeter. The core of the hollow body is filled with a high energy explosive material of any suitable grade and composition. The open and trailing end of the body is closed by the base plug fuse means. By reason of the body of the improved projectile being of a heavy material of a predetermined density the projectile not only has enhanced ballistic coefficient (shortened time to reach a target) but also has enhanced momentum (kinetic energy) for effectively penetrating the impacted target prior to detonation of the high energy explosive means and explosive fragmentation of the body for destruction of the target. Depending on the requirements of the projectile in penetrating a target, the nose can be filled with a suitable incendiary material.

SUMMARY OF THE INVENTION

An object of the invention is to provide an improved armor-piercing projectile with an enhanced ballistic coefficient for enabling the projectile not only to strike a target in shorter time than prior projectiles, but also to have greater kinetic energy when impacting the target so as to assure penetration and destruction of same.

Still another object of the invention is to provide an improved armor-piercing projectile of relatively simple construction and design that enables it to be produced in a wide range of caliber and saboted, subcaliber configurations for use in a variety of weapons.

Still another object of the invention is to provide an improved armor-piercing projectile having an explosive-filled, fragmentable hollow body made up of a heavy material that has a predetermined density of at least eleven grams per cubic centimeter where such heavy material significantly contributes to the enhanced ballistic coefficient of the projectile, its increased target penetration characteristics as well as its increased capability to destroy the target.

In summary, the improved armor-piercing projectile is generally comprised of a dome-shaped, ballistic nose, a hollow fragmentable body of thimble-like configuration, and a base-plug fuse device. The projectile nose is preferably formed from a suitable ferrous, nonferrous or plastic material of sheet-like configuration. By reason of the nose sheet-like construction it can be readily attached to the closed end of the hollow body. The interior of the nose is normally filled with a suitable incendiary material.

The hollow body is advantageously made up of a heavy material having a predetermined density of at least eleven grams per cubic centimeter (11.0 grams per cubic centimeter). The material of the body is preferably either a tungsten alloy or depleted uranium. The closed and forward end of the body can be of any suitable shape (for example, domed, concave, etc.) for assisting the projectile in penetrating a target regardless of the angle of projectile impact. The trailing end of the hollow body is closed off by the base-plug, fuse device. The core of the body is filled with a suitable high energy explosive material.

In an operative mode of the improved projectile with a heavy body of predetermined density whether of a caliber or saboted, subcaliber design, it exhibits an increased ballistic coefficient for striking a target in shorter time with greater momentum. Thus, the projectile provides greater reliability in penetrating an armored, fast-moving target as well as destruction of the penetrated target by reason of explosive distribution of the heavier body fragments upon timely detonation of the high energy explosive material by the base-plug, fuse device.

Other objects and advantages of the invention will become more apparent when taken in conjunction with the accompanying specification and drawings as follows:

BRIEF DESCRIPTION OF THE DRAWINGS

FIG. 1 is a combined longitudinal and schematic view of an embodiment of an armor-piercing projectile of the invention.

FIG. 2 is a fragmented longitudinal sectional view as taken along line 2—2 of FIG. 1 and illustrates further details of the invention.

FIG. 3 is a longitudinal sectional view of another embodiment of an armor-piercing projectile of the invention.

FIG. 4 is a representative graphical view of velocity verse range for comparing the performance of a typical armor-piercing projectile with the enhanced performance of the improved projectile of the invention.

DETAILED DESCRIPTION OF THE INVENTION

With further reference to FIG. 1, an improved armor-piercing projectile 10 of the invention is generally comprised of a dome-shaped ballistic nose 12, an explodable hollow body 14 of thimble-like configuration and an integrated base-plug, fuse device 16. Nose 12 is preferably of hollow construction such that its outer skin 18 is made of a suitable sheet-like material, e.g., ferrous, nonferrous or plastic material. The interior of nose 12 is normally filled with an incendiary material 20 for assisting projectile 10 in penetrating, e.g., an armored fast-moving target.

Explodable hollow body 14 is advantageously made up of a heavy material having a predetermined density of at least eleven grams per cubic centimeter (11.0 gm/cc) and preferably composed of either a suitable grade of a tungsten alloy or depleted uranium. One suitable tungsten alloy, e.g., is tungsten carbide. Body 14 is normally of one-piece construction and its forwardmost end face 22 may be of conical shape as shown in FIG. 1 or any other suitable shape such as concave dish-shaped for facilitating the penetration of an armored target regardless of the angle of impact of projectile 10. The outer annular surface 24 of body 14 at its forward end is provided with an annular groove 26 for facilitating the connection of nose skin 18 to body 14. Outer body surface 24 may be provided with one or more groove-mounted, rotating bands 28 for causing spin stabilization of the projectile when it is launched. It is noted here that in certain instances body 14 at its forward end may be of two-piece construction. Depending on the target to be impacted, the outer end face configuration of body 14 may have to be changed. Hence, a cappedshaped end for body 14 as shown by dotted line 29, would permit selective change of the body forward end face without adversely affecting the performance of the improved projectile.

A high energy explosive material 30 of any suitable composition or admixture is disposed in the interior of body 14. The open end of the interior of body 14 is closed off by an integrated base-plug and fuse device 16 as shown in FIG. 1. The inner reduced end 32 of device 16 incorporates a suitable fuse mechanism 32 of a readily commercially available design that is responsive to the deceleration of the projectile in striking a target for the purpose of detonating material 30 after the projectile sufficiently penetrates the target.

When high energy explosive material 30 is detonated by device 32, body 14 is usually broken up into a plurality of different sized fragments that are exploded radially outward in numerous directions about projectile axis 34. By reason of the exploded fragments being made up of a heavy material, destruction of the target is assured with greater probability than projectiles of prior art construction. If a plurality of fragments of a particular shape is desired, interior surface 36 of body 14 is provided with separate pluralities of uniformly and relatively spaced generally longitudinal and radial intersecting grooves so as to form a grid pattern 38 of any desired shape as illustrated in FIG. 2.

Since improved projectile 10 is of simple aerodynamic design it not only is suitable for the caliber shape of FIG. 1, but also is readily adaptable to the saboted, subcaliber projectile embodiment 40 of the invention as shown in FIG. 3. Projectile 40 is generally comprised of an improved armor-piercing, subcaliber projectile inner portion 42 of similar construction as projectile 10 but incorporating a base plug device having an enlarged end 44. An outer two-piece caliber section 43 covers inner projectile 42 and is retained by end 44 until projectile 40 is launched.

In an operative embodiment of either projectile 10 or 42 reference is now made to FIG. 4. Downwardly extending curved line 46 represents the performance of a prior projectile without incorporating the novel hollow body 14 or 14′ of heavy material and predetermined density. Slightly downwardly inclined line 48 of less slope and greater radius than curved line 46 represents the performance of either improved projectile 10 or 42. By reason of body 14 or 14′ being composed of heavy material as aforedescribed, the improved projectile is unable to achieve the initial launch velocity of a prior lighter weight projectile of comparable design. However, the prior lighter weight projectile has less momentum and thus is more susceptible to adverse atmospheric effects. Consequently, at some point along the effective range of a projectile, that follows curve 46, its velocity becomes less than the velocity of curve 48 and thus its kinetic energy is less than the improved projectile. The improved projectile, because it maintains a substantially more uniform velocity (as represented by line 48) throughout its effective range, not only will reach a fast moving target in shorter time, but also, because of its greater momentum, will effectively penetrate a fast moving, armored target with greater probability of success than the projectile following curve 46. Moreover, the heavy, hollow body of predetermined density of either projectile 10 or 42 not only assists in impacting a target with greater momentum, but also assists in penetrating the target as well as causes greater destruction inside the target once the heavier fragments of body 14 or 14′ are formed and explosively distributed as the result of timely detonating high energy explosive material 30 or 30′.

Obviously many modifications and variations of the present invention are possible in light of the above teachings. It is b therefore to be understood that within the scope of the appended claims, the invention may be practiced otherwise than as specifically described.

What is claimed is:

1. An armor-piercing projectile, said projectile comprising:

ballistic nose means of dome-like shape, explosive and fragmentable body means of thimble-like configuration connected to the trailing and enlarged end of the nose means, high-energy explosive means disposed in the interior of the body means, and base-plug fuse means connected to the trailing end of the body means for closing off the open end of the interior and for timely detonating the high-energy explosive means upon the projectile impacting a target, the body means being made up of a relatively hard and dense material having a predetermined density of at least eleven grams per cubic centimeter so as to enhance both the ballistic coefficient and penetration characteristics of the projectile during its use.

2. A projectile as set forth in claim 1 wherein the material of the body means is selected from the group of nonferrous materials, namely, depleted uranium and tungsten alloys.

3. A projectile as set forth in claim 1 wherein the internal surface means of the body means is provided with a grooved grid pattern formed therein so as to enhance the fragmentation of the body means upon detonation of said high energy explosive means during projectile use.

4. A projectile as set forth in claim 1 wherein the nose means is of hollow construction.

5. A projectile as set forth in claim 4 wherein the hollow interior of the nose means is filled with an incendiary material.

6. A projectile as set forth in claim 4 wherein the nose means is comprised of outer skin means of sheet-like thickness.

7. A projectile as set forth in claim 6 wherein the skin means is made up of a suitable ferrous, nonferrous or plastic material.

8. A projectile as set forth in claim 1 wherein the outer surface of said body means is provided with at least one rotating band means.

9. A projectile as set forth in claim 1 wherein the projectile is of caliber shape.

10. A projectile as set forth in claim 1 wherein the projectile is of saboted, subcaliber shape.

* * * * *